United States Patent [19]

Morikiyo et al.

[11] Patent Number: 5,096,047
[45] Date of Patent: Mar. 17, 1992

[54] BASKET IN BASKET CONVEYOR

[75] Inventors: Akira Morikiyo, Tokororozawa; Hitoshi Komuro, Okoze-higashi; Ryosuke Shiibashi, Hannoshi, all of Japan

[73] Assignee: Tsubakimoto Chain Co., Osaka, Japan

[21] Appl. No.: 524,758

[22] Filed: May 16, 1990

[30] Foreign Application Priority Data

May 17, 1989 [JP] Japan .................. 1-55737[U]

[51] Int. Cl.⁵ .............................. B65G 17/36
[52] U.S. Cl. ..................... 198/704; 198/713
[58] Field of Search .................. 198/704, 713

[56] References Cited

U.S. PATENT DOCUMENTS

| 865,045 | 9/1907 | Jones | 198/704 X |
|---|---|---|---|
| 3,904,081 | 9/1975 | Mize | 198/704 X |
| 4,171,739 | 10/1979 | Yamoto | 198/704 |
| 4,964,499 | 10/1990 | Morikiyo et al. | 198/365 |

FOREIGN PATENT DOCUMENTS

| 2835350 | 2/1979 | Fed. Rep. of Germany | 198/713 |
|---|---|---|---|
| 0149909 | 11/1981 | Japan | 198/704 |
| 9632 | of 1895 | United Kingdom | 198/713 |
| 1023460 | 3/1966 | United Kingdom | 198/713 |

Primary Examiner—Robert P. Olszewski
Assistant Examiner—Cheryl L. Gastineau
Attorney, Agent, or Firm—Howson & Howson

[57] ABSTRACT

A basket for a basket conveyor comprising a plurality of bottom-opening baskets is disclosed. The basket is characterized in that side plates thereof spread upwardly so as to enlarge the article receiving opening sidewardly. The internal walls of the basket may be provided with projections so as to enable smooth discharging of the articles when the bottom cover is opened. Moreover, complimentary projections and channels may be provided to the edge of the article discharging port and the upper surface of the bottom cover respectively in the direction of opening and closing of the bottom cover to prevent jamming of the sorted articles.

4 Claims, 4 Drawing Sheets

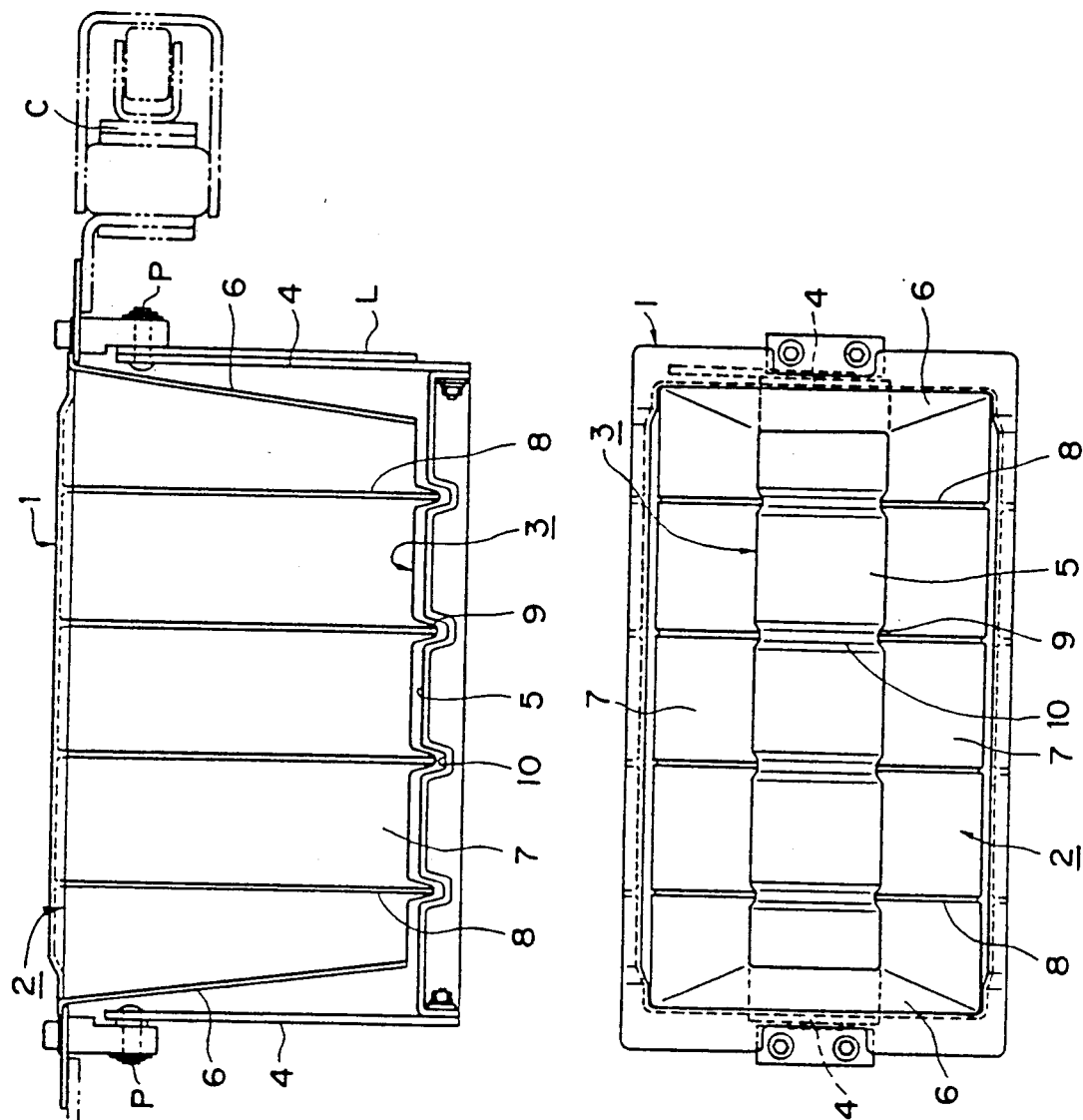

FIG. 6

BASKET IN BASKET CONVEYOR

FIELD OF THE INVENTION

This invention relates to a basket in a basket conveyor which is suitable for use as a sorting conveyor of various articles, including books, magazines and newspapers.

BACKGROUND OF INVENTION

As shown in FIG. 3, a conventional basket conveyor comprises a plurality of baskets arranged on a pair of conveyor chains C, C. An article discharging port D formed at the bottom of each basket B may be closed or opened by means of a cover B' which is mounted to a lever S pivotably supported on the basket B by means of a pin P. Said cover B' is urged by its own weight so as to close the port D. A cam lever L attached to said lever S has a cam surface F bent backwardly, which is adapted to be pushed upwardly by a cam roller R which is disposed at the position where the article (not shown) within the basket B is to be discharged. When this engagement of the cam surface F with the cam roller R takes place, the article contained in the basket B may be discharged from the port D as the cover B' is opened against the urging force.

Although the front and rear walls B1, B1 of the basket B spread upwardly as shown in FIG. 5, a pair of the side plates B2, B2 are disposed upright as shown in FIG. 4.

In case of the above-mentioned prior art, such basket conveyors are often arranged at different levels such that article(s) in the basket of an upper basket conveyor may be sorted and discharged into the basket of a lower basket conveyor. The so-called timing basket(s) are adapted to intervene the two basket conveyors arranged at the different levels such that the requisite matching in the timing respecting receipt and discharge of the articles is achieved between the upper and lower basket conveyors. It is possible to accommodate or absorb the timing error to a certain extent in a single stage; however, accommodation of the timing errors in multiple stages is sometimes difficult. As result, the article discharged from the timing basket is sometimes not received properly by the basket of the lower basket conveyor. In order to cope with this, it has been necessary to make the timing basket sized larger than the upper basket; and to make the lower basket sized larger than the timing basket.

This has caused the total number of the baskets mountable to the conveyor chain to decrease, and on the other hand, the basket conveyor has become large sized as a whole requiring a larger mounting space.

In the next place, as shown in FIG. 4, the longitudinal, internal walls B1, B1 of a basket B are conventionally simply flat. Thus, when sheet-like articles are supported upright within the basket B, the lower edges of the articles will be supported on the bottom cover B' and the flat portions of the articles tend to adhere to the flat, internal walls B1, B1. This is oftentimes the case when the humidity is relatively high. Consequently, even if the bottom cover B is opened, the articles may sometimes be prevented from dropping from the basket at the position where they are supposed to be discharged.

Thirdly, as shown in FIG. 4, the edge of the article discharging port D and the upper surface of the bottom cover B' face parallel with each other with a small gap δ therebetween. Therefore, in case relatively soft, sheet-like articles, such as, sheets of paper, are held upright in the basket B, with the lower edges of such articles being supported on the upper surface of the bottom cover B', the articles are susceptible to jamming in the small gap as result of the movement of the bottom cover B' when it is opened. This makes the opening motion of the bottom cover B' difficult; and then the discharging of the articles at the prescribed position may not be effected accurately.

SUMMARY OF INVENTION

The present invention has solved the abovementioned first problem by the invention in which the side plates of a basket spread upwardly, thereby enlarging only the article receiving opening sidewardly, thus avoiding enlargement of the opening through the enlargement of the basket as a whole.

Thus, in an arrangement in which timing basket(s) intervene between an upper basket conveyor and a lower basket conveyor arranged at different levels, the accumulation of timing error may be absorbed as result of the above-mentioned enlargement of the article receiving opening in the baskets while avoiding the enlargement of the basket as a whole.

In the next place, the present invention has solved the above-mentioned second problem by the invention in which the internal walls of the basket are provided with projections for preventing articles to be sorted from adhering to said walls.

In case the flat portions of sheet-like articles are supported by the internal walls of a basket, by providing projections on the internal walls, the sheet-like articles may be prevented from adhering thereto, which ensures that the articles may be smoothly discharged as soon as the bottom cover is opened.

Thirdly, the present invention has solved the above-mentioned third problem by the invention in which the complimentary projections and channels are provided to the edge of the article discharging port and to the upper surface of the bottom cover respectively in the direction of the opening and closing of said cover.

Normally, the lower edges of the sheet-like articles contained in the basket are supported by the convex portions of the upper surface of the bottom cover and the projections formed on the lower edges of the article discharging port are accommodated in the channels formed on the upper surface of the bottom cover. Thus, when the bottom cover is opened, the projections formed on the lower edge of the article discharging port may prevent the sheet-like articles from accompanying the movement of the bottom cover tending to cause jamming in the gap between the edge of the article discharging port and the bottom cover.

BRIEF DESCRIPTION OF THE DRAWINGS

FIG. 1 is a front view of the basket according to this invention;

FIG. 2 is a plan view thereof;

FIG. 6 is a schematic view of a multi-level basket conveyor according to the invention.

PREFERRED EMBODIMENTS

FIG. 1 illustrates a front view of the basket according to the present invention and FIG. 2 is a plan view thereof. The body 1 of the basket has an articles receiving opening 2 on its top and an article discharging port 3 at its bottom. As is the case with the prior art, these baskets are hung to a pair of parallel conveyor chains C, C.

Figure 3:
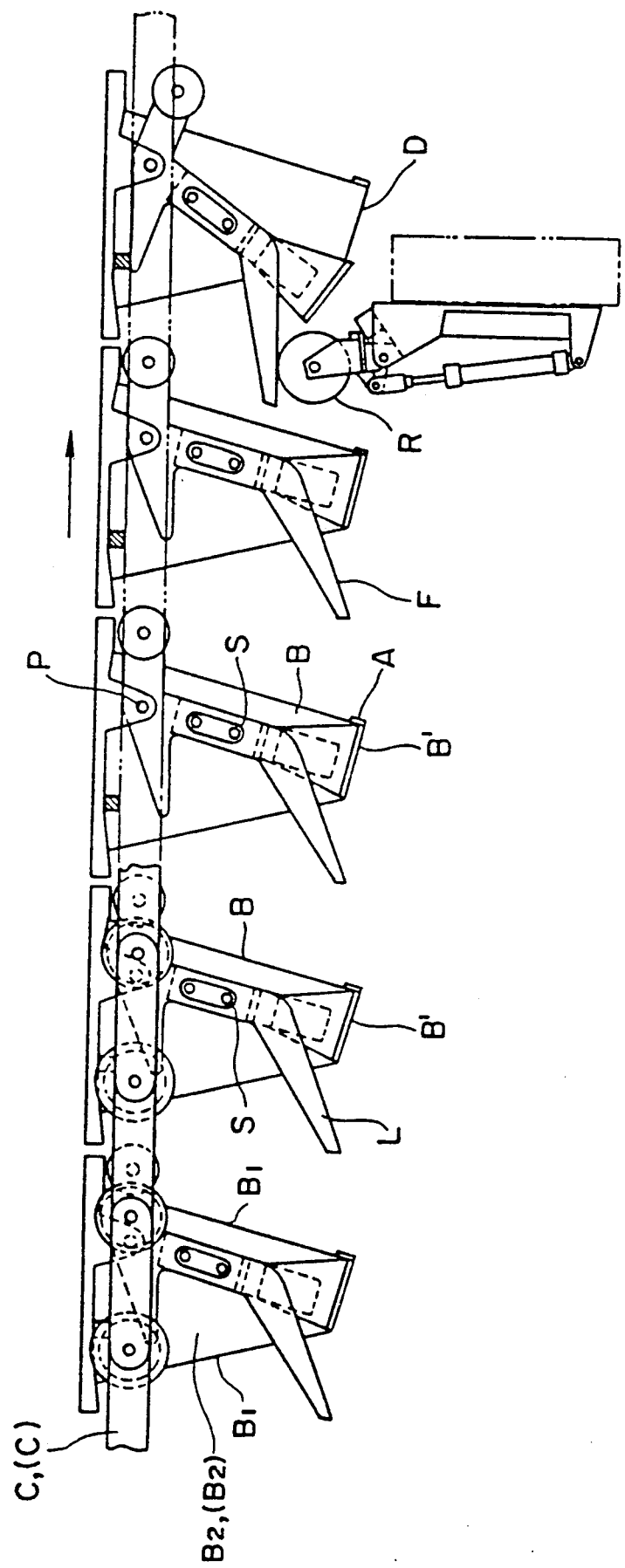
FIG. 3 is a side view of a conventional basket conveyor.
Figure 4:
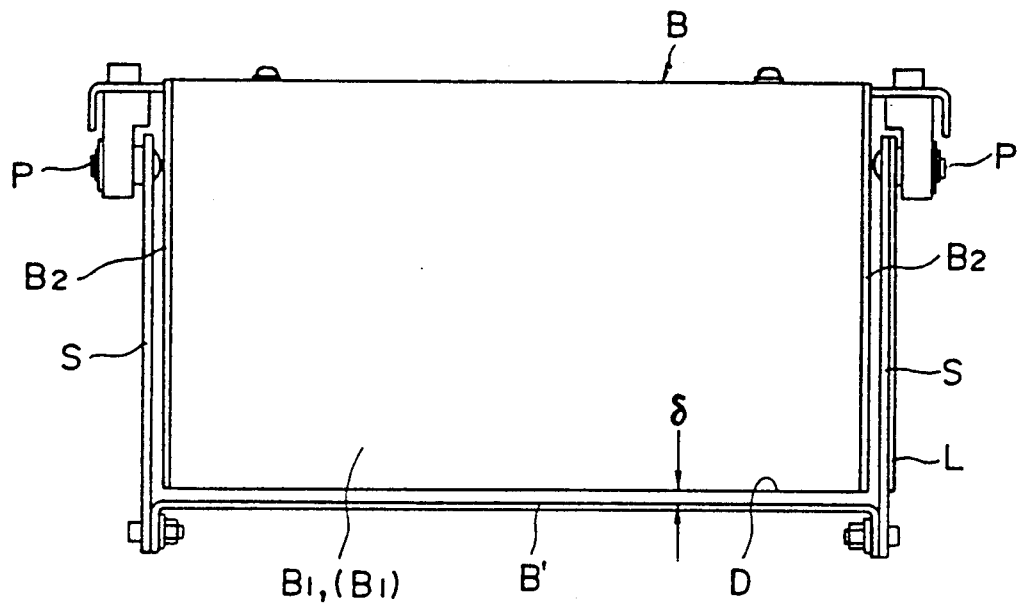
FIG. 4 is a front view of a conventional basket.
Figure 5:
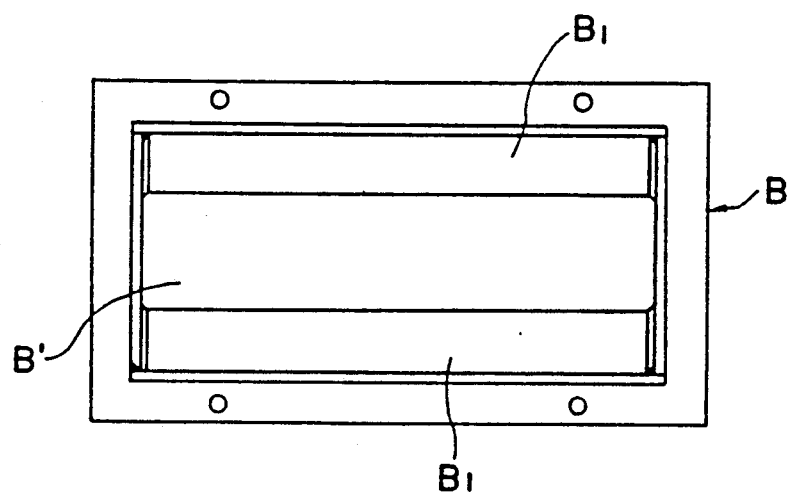
FIG. 5 is a plan view of a conventional basket.

A pair of bottom cover suspension levers 4, 4 are supported by pins P, P to the body 1 so as to be pivotable longitudinally. At the lower ends of the bottom cover suspension levers 4, 4, a bottom cover 5 is mounted so as to be urged in the direction to close the article discharging port 3. As shown in FIG. 3, the buttom cover 5 is adapted to be openable by means of a cam lever L and a cam roller R.

A pair of the side plates 6, 6 of the body 1 of the basket are mounted in a manner to spread upwardly, thus enlarging the article receiving opening 2 in the sideward direction only without causing the article discharging port 3 to become enlarged.

Consequently, the article supporting area of the bottom cover 5 remains the same, and even if the timing error between the basket conveyors crossing at different levels becomes somewhat larger, the error may be absorbed as the article receiving opening is sidewardly enlarged as mentioned above, thus improving accuracy of article discharging and receiving through the baskets.

Referring to FIG. 6, a multi-level conveyor according to the invention comprises an upper basket conveyor 11, a set of, timing baskets 12, and a lower basket conveyor 13. The upper conveyor 11 comprises a series of bottom-opening baskets corresponding to those shown in FIGS. 1 and 2, with upwardly spread side plates. The upper basket conveyor moves perpendicular to the plane of the drawing, and only one basket of the upper conveyor is seen in FIG. 6. The timing baskets 12 move transverse to the direction of the upper conveyor, as do the baskets of lower conveyor 13.

In the next place, the longitudinal, internal walls 7, 7 are adapted to support the flat portions of sheet-like articles; and on at least one of the walls 7, 7, are formed parallel, elongated projections 8 in the form of the so-called "rigs". Thus, the flat portions of the sheet-like articles are prevented from adhering to the internal walls 7, 7, thereby assuring that the articles may, sliding along the internal walls 7, 7, smoothly drop from the discharging port 3 when the bottom cover 5 is opened. This is particularly effective for sorting "damp" articles or when humidity is relatively high.

The projections may not necessarily be in the form of the elongated ribs. A plurality of conical or semi-spherical projections (not shown) distributed over the wall will function similarly.

As seen from FIGS. 1 and 2, complimentary projections 9 and channels 10 are formed on the lower edges of the article discharging port 3 and the upper surface of the bottom cover 5 respectively in the opening and closing direction of the bottom cover 5 so as not to impede the motion of the bottom cover 5.

Thus, when the bottom cover 5 is opened, the projections 9 formed on the lower edge of the article discharging port 3 may prevent the sheet-like articles from accompanying the movement of the bottom cover 5 tending to cause "jamming" in the gap between the edges of the article discharging port 3 and the bottom cover 5.

This will substantially improve the accuracy of discharging/receiving of the sorted articles, thus improving the over-all efficiency of sorting.

According to the present invention, as above described, since the side plates of a body of a basket are spread upwardly, the article receiving opening of the basket may be enlarged. Thus, even if there is timing error between the basket conveyors crossing at different levels, the error may be absorbed as the article receiving opening is sidewardly enlarged thus ensuring positive article discharging and receiving through the baskets. As a result, it is no longer necessary to enlarge a basket as a whole in order to enlarge the article receiving opening, thus avoiding enlargement of the sorting conveyor system as a whole saving space at the same time. It is also possible to increase the number of the total baskets mountable to the conveyor chain improving the efficiency of sorting operation. In addition, since the article discharging port is not enlarged at all, delay of discharging action may be prevented.

Furthermore, since the projections are formed on the internal walls of the body of a basket, sheet-like articles may be prevented from adhering thereto, which ensures that the articles may be smoothly discharged as soon as the bottom cover is opened. Thus, it is possible not only to substantially improve the sorting accuracy but to improve the sorting efficiency by increasing the over-all speed of conveyance.

In addition, since the complimentary projections and channels are formed to the edge of an article discharging port of a basket body and the upper surface of the bottom cover respectively in the direction of opening and closing of said cover, when the bottom cover is opened, the projections formed on the lower edge of the article discharging port may prevent the sheet-like articles from accompanying the movement of the bottom cover tending to cause jamming in the gap between the edges of the article discharging port and the bottom cover. This will substantially improve the accuracy of discharging/receiving of the sorted articles, thus improving the efficiency of sorting operation.

What is claimed is:

1. In a basket conveyor comprising a plurality of bottom-opening baskets movable along a first path at a first level, and a plurality of baskets movable along a second path crossing said first path at a second level below said first level and adapted to receive materials discharged from said bottom-opening baskets movable along the first path, wherein each of said bottom-opening baskets has a top opening and a closable bottom opening and comprises front plates, rear plates and side plates extending from the front plates to the rear plates, said front, rear and side plates forming walls of the bottom-opening basket extending from the top opening to the bottom opening, and said front and rear plates of each of said bottom-opening baskets being arranged one ahead of the other along said first path, and said side plates extending substantially parallel to said first path, characterized in that said side plates of said bottom opening baskets spread upwardly.

2. A basket conveyor according to claim 1 in which each of said front, rear and side plates of each of said bottom-opening baskets has an internal face, and in which at least one of the internal faces of each of said bottom-opening baskets is provided with projection means for preventing articles from adhering to said one face and ensuring smooth discharge of said articles as soon as said closable bottom opening is opened.

3. The basket conveyor according to claim 2 wherein said projection means comprises at least one rib.

4. A basket for a basket conveyor comprising a plurality of bottom-opening baskets, said basket comprising a top opening, a bottom opening, front, rear and side walls extending from said top opening to said bottom opening, each of said walls having a lower edge defining a boundary of said bottom opening, bottom cover means providing an openable closure for said bottom opening and having an upper surface, and means for mounting said bottom cover means for transverse sliding movement across the lower edge of one of said walls to effect opening of said closure, characterized in that said lower edge of said one of said walls is provided with a series of spaced, downwardly extending projections, and said upper surface of said bottom cover means has a series of parallel, spaced channels extending in the direction of said transverse sliding movement, each of said channels receiving one of said projections, whereby the projections move through the channels as the bottom cover means opens and closes, and prevent jamming of articles contained in the basket between the bottom cover means and the lower edge of said one of said walls as the bottom cover opens.

* * * * *